United States Patent
Vouk (10) Patent No.: US 12,541,917 B1
(45) Date of Patent: Feb. 3, 2026

(54) ALTERNATIVE OBJECT REPRESENTATIONS IN MULTI-USER COMMUNICATION SESSIONS

(71) Applicant: Apple Inc., Cupertino, CA (US)

(72) Inventor: Leanid Vouk, San Carlos, CA (US)

(73) Assignee: Apple Inc., Cupertino, CA (US)

( * ) Notice: Subject to any disclaimer, the term of this patent is extended or adjusted under 35 U.S.C. 154(b) by 130 days.

(21) Appl. No.: 18/369,517

(22) Filed: Sep. 18, 2023

Related U.S. Application Data (60) Provisional application No. 63/409,062, filed on Sep. 22, 2022.

(51) Int. Cl.
*G06T 17/00* (2006.01)
*G06T 7/70* (2017.01)
*H04N 7/15* (2006.01)
*H04N 13/332* (2018.01)

(52) U.S. Cl.
CPC ............... *G06T 17/00* (2013.01); *G06T 7/70* (2017.01); *H04N 7/152* (2013.01); *H04N 13/332* (2018.05); *G06T 2207/30201* (2013.01)

(58) Field of Classification Search
None
See application file for complete search history.

(56) References Cited

U.S. PATENT DOCUMENTS

| | | | |
|---|---|---|---|
| 10,909,761 B1 * | 2/2021 | Reid | H04N 13/344 |
| 2021/0068203 A1 * | 3/2021 | Katrib | H04N 21/436 |
| 2023/0363679 A1 * | 11/2023 | Wang | G06N 3/047 |
| 2024/0388681 A1 * | 11/2024 | Varekamp | H04N 13/139 |

* cited by examiner

*Primary Examiner* — Frank S Chen
(74) *Attorney, Agent, or Firm* — Thompson Hine LLP (57) ABSTRACT

Various implementations share both 2D video stream data and additional data (e.g., 3D data) during multi-user communication sessions and enable the receiving (viewing) device to selectively use such information based on circumstances. For example, based on a receiving (viewing) device having stereo-viewing capabilities (e.g., such as a head mounted device may have), the device may determine to use the additional data to present the received 2D video stream in a way that adds depth to a user representation or other object. In contrast, based on a receiving (viewing) device (e.g., such is a conventional tablet, mobile device, or laptop) not having stereo-viewing capabilities, the device may determine to simply display the 2D video stream in 2D, without necessarily using the additional data.

24 Claims, 5 Drawing Sheets

Receive a 2D video stream during a multi-user communication session, where the 2D video stream is captured via an image sensor on a second electronic device during the multi-user communication session ⟋ 710

Receive 3D data corresponding to at least a portion of the 2D video stream, wherein the 3D data is based on sensor data captured at the second electronic device during the multi-user communication session; ⟋ 720

Determine a presentation mode for presenting the 2D video during the multi-user communication session, where the presentation mode is based on a criterion ⟋ 730

Present the 2D video stream based on the determined presentation mode ⟋ 740

ALTERNATIVE OBJECT REPRESENTATIONS IN MULTI-USER COMMUNICATION SESSIONS

CROSS-REFERENCE TO RELATED APPLICATION

This application claims the benefit of U.S. Provisional Application Ser. No. 63/409,062 filed Sep. 22, 2022, which is incorporated herein in its entirety.

TECHNICAL FIELD

The present disclosure generally relates to representing users and other objects in communication sessions involving users of multiple electronic devices.

BACKGROUND

Various techniques are used to share content during multi-user communications sessions. For example, two-dimensional video streams and audio streams may be shared amongst the participants of such sessions to enable the participants to see and hear one another and their respective background environments, e.g., during video conference calls. Existing multi-user communication session techniques may not adequately utilize 3D information to enhance such experiences and may not adequately account for or customize the experiences based on variable circumstances, such as a receiving device's stereo-viewing capabilities.

SUMMARY

Various implementations disclosed herein include devices, systems, and methods that share both two-dimensional (2D) video stream data and additional data (e.g., three-dimensional (3D) data) during multi-user communication sessions and enable the receiving (viewing) device to selectively use such information based on circumstances. For example, based on a receiving (viewing) device having stereo-viewing capabilities (e.g., such as a head mounted device may have), the device may determine to use the additional data to present the received 2D video stream in a way that adds depth or other 3D appearance attributes to a representation of a user or other object. In contrast, based on a receiving (viewing) device (e.g., such is a conventional tablet, mobile device, or laptop) not having stereo-viewing capabilities, the device may determine to simply display the 2D video stream in 2D, without necessarily using the additional data. In some implementations, a device receives 2D video data and associated depth or other 3D data during a multi-user communication session and presents the 2D video with or without using the 3D data based on a presentation mode that is determined based on a criterion, e.g., type of device (HMD or not), capabilities (capable of displaying stereo/3D/2.5D or not), quality/amount of the 3D data, etc. The sending device may be configured to send additional data that can be used selectively, in variable circumstances, to enable different presentation modes by the receiving device, e.g., one receiving device using the additional data to provide a mode that includes a stereo/3D/2.5D object representation with a 2D background and another receiving device not necessarily using the extra data to provide a different mode that provides a 2D only view of the 2D video stream, depicting the object in 2D.

In some implementations a processor performs a method by executing instructions stored on a computer readable medium. The method may be performed at a first device, such as at a viewer's device, having a processor. The method receives a 2D video stream during a multi-user communication session. The 2D video stream is captured via an image sensor on a second electronic device during the multi-user communication session.

The method receives 3D data corresponding to at least a portion of the 2D video stream. At least some of the 3D data is based on sensor data captured at the second electronic device during the multi-user communication session. In some implementations, the 3D data corresponds to one or more particular objects (e.g., a user representation, an object of interest, etc.) depicted in the 2D video. In some implementations, the 3D data corresponds to particular time segments such as every 10th frame of the 2D video stream.

The method determines a presentation mode for presenting the 2D video during the multi-user communication session. The presentation mode is based on a criterion. In some implementations, the presentation mode is determined to be a first presentation mode depicting the 2D video stream without using the 3D data or a second presentation mode depicting the 2D video stream using the 3D data to provide an appearance of depth to an object (e.g., user representation) depicted in the 2D video stream. For example, in the second presentation mode, the object (e.g., user representation) may appear to have depth and be displayed in front of a 2D background from the 2D video stream.

The method presents the 2D video stream based on the determined presentation mode. Thus, in accordance with a determination that the presentation mode is a first presentation mode, the method presents a representation of the 2D video stream without using the 3D data and, in accordance with a determination that the presentation mode is a second presentation mode, the method presents a representation of the 2D video stream using the 3D data to provide an appearance of depth to an object depicted in the 2D video stream. In one example, the 2D video stream is presented in 3D or 2.5D on an HMD that offers stereo viewing and 2D only on a device that offers monoscopic viewing, e.g., a tablet having an single display displaying a single set of content for both eyes to view.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Figure 1:
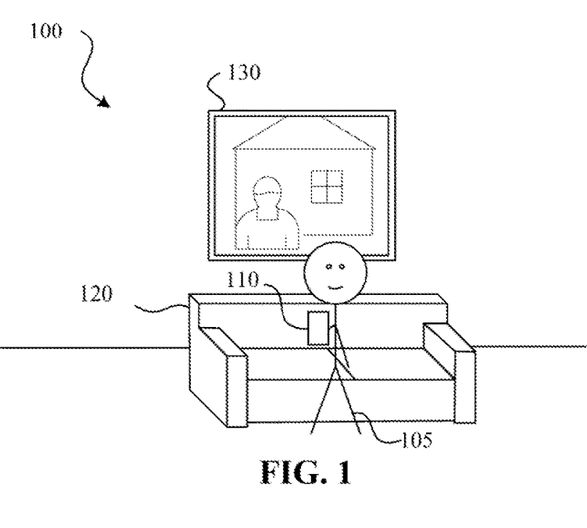
FIG. 1 illustrates an exemplary electronic device in a physical environment during a communication session, in accordance with some implementations.

FIG. 1 illustrates an exemplary electronic device 110 operating in a physical environment 100. In FIG. 1, the physical environment 100 is a room that includes a first user 105, the first user's couch 120, and the first user's wall hung painting 130. The physical environment 100 also includes walls, a floor, and a ceiling.

FIGS. 2-6 illustrate different exemplary electronic devices 210, 310, 410, 510, 610 in a second physical environment 200 and used by user 205 to participate in a communication session with the electronic device 110 of FIG. 1. The physical environment 200 includes a door 250, walls, a floor, and a ceiling.

The electronic devices 110, 210, 310, 410, 510, 610 may each include one or more cameras, microphones, depth sensors, or other sensors that can be used to capture information about and evaluate the physical environment 100/200 and the objects within the environment, as well as information about the user 105/205. Each may use information about the physical environment 100/200 and user 105/205 that it obtains from its sensors to provide visual and audio content to view or share content during a communication session.

The electronic devices 110, 210, 310, 410, 510, 610 may communicate with one another directly or indirectly (e.g., via an intermediary device or server) to share content during a communication session. For example, electronic device 110 may share audio data, a 2D video stream, and additional data captured in physical environment 100 and that shared content may be presented audibly and visually on one or more of the other electronic devices 210, 310, 410, 510, 610 in real time during the communication session. Similarly, the other electronic devices 210, 310, 410, 510 610 may each share audio data, a 2D video stream, and additional data captured in physical environment 200 and that shared content may be played audibly and displayed visually on electronic device 110 in real time during the communication session.

The additional data provided by electronic device 110 may be based on sensor data corresponding to an object, such the user 105. For example, electronic device 110 may capture sensor data including stereo images, depth data, motion data, etc. or use such data to generate a 3D model or other representation that corresponds to the 3D appearance of the user 105. The electronic device 110 may share this additional data in the communication session such that the other electronic devices 210, 310, 410, 510, 610 can selectively use the additional data to present a representation of the user 110.

In some implementations, the additional data comprises depth data or other 3D data from which a 3D shape of the user or other object can be determined. Some or all of the additional data data may include sensor data obtained prior to the communication session, e.g., during a previous enrollment. The previously-obtained additional data may include enrollment data including data about portions of the user that may not be captured during the live communication session, e.g., 3D information regarding the sides, top, and back of the user's head, etc.

In some implementations, shared data (e.g., shared 2D video stream data and additional data) is used to present user representations during the communication session within a 3D environment. According to some implementations, a receiving device may generate and present an extended reality (XR) environment in which the shared data is presented.

Figure 2:
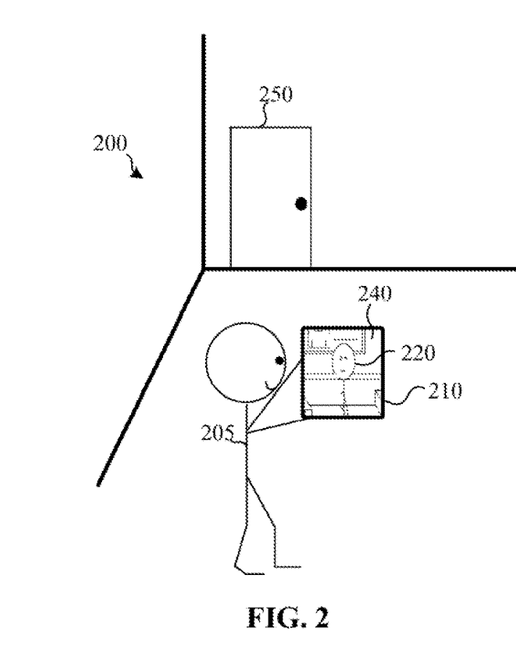
FIGS. 2-6 illustrate electronic devices involved in the communication session with the electronic device of FIG. 1 in which received content is presented using a selected presentation mode, in accordance with some implementations.

In FIG. 2, the electronic device 210 is a tablet computing device that has a single display and does not include multiple displays (or segmented display portions) that are intended for different eye viewing. Instead, the display of electronic device 210 presents a single view of content to be viewed by both of the eyes of the user 205. The electronic device 210 is thus not configured for stereo viewing. The electronic device 210 receives shared content from electronic device 110 during the communication that includes a 2D video stream and additional data. The electronic device 210 determines a presentation mode based on recognizing or otherwise determining whether the circumstances satisfy a criterion. For example, the criterion may be whether the electronic device 210 is configured for stereo viewing or not configured for stereo viewing. In the example of FIG. 2, based on determining that the electronic device 210 is not configured for stereo viewing, it determines to use a presentation mode in which the 2D video stream is presented in 2D on the display of the electronic device 210. Thus, the electronic device 210 displays a 2D representation 220 of the user 110 as part of the displayed 2D video 240. In this example, the additional data is not used in presenting the 3D video 240.

Figure 3:
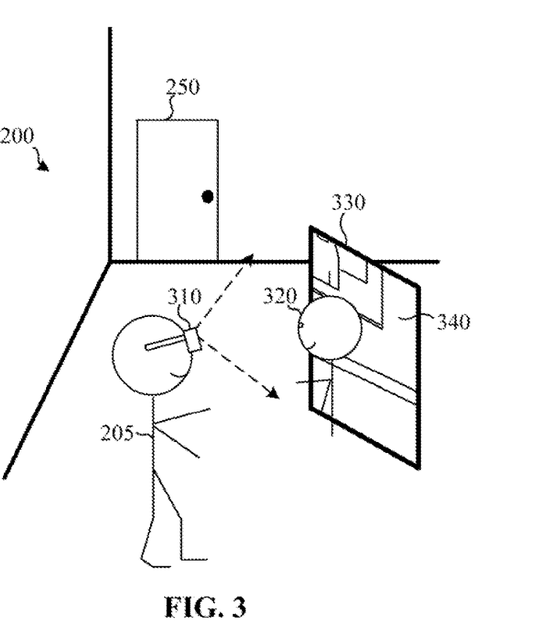

In FIG. 3, the electronic device 310 is a head mounted display (HMD) that has a display for each eye (e.g., a left eye display and a right eye display). The electronic device 310 is configured for stereo viewing. The electronic device 310 receives shared content from electronic device 110 during the communication session that includes a 2D video stream and additional data. The electronic device 310 determines a presentation mode based on recognizing or otherwise determining whether the circumstances satisfy a criterion. For example, the criterion may be whether the electronic device 310 is configured for stereo viewing or not configured for stereo viewing. In the example of FIG. 3, based on determining that the electronic device 310 is configured for stereo viewing, it determines to use a presentation mode in which the 2D video stream is presented and the additional data is used to provide a 3D representation as part of an extended reality (XR) environment that is based on the physical environment 200. FIG. 3 illustrates a virtual screen 330 and 3D representation 320 that are positioned in the XR environment relative to the physical environment 200, e.g., based on a 3D coordinate system of the physical environment 200 and amongst representations of the physical environment in XR environment.

The additional data may be used along with the 2D video stream to create a 3D representation 320 in various ways. In one example, the additional data provides depth data, e.g., relative to a flat or curved surface, upon which image data of the 2D video stream is positioned. For example, such depth data may identify depth values for multiple positions in 3D space upon which corresponding portions of the 2D video stream data are to be positioned. The 2D video stream may be presented on a virtual surface that is shaped based on such depth data, e.g., effectively warping/changing portions of the 2D video stream for 3D viewing. For example, the portion of a 2D video stream corresponding to the user 105's face may be displayed on a virtual surface in 3D space corresponding to the shape of the user 105's face. A a portion of 2D video stream corresponding to the user 105's nose may be positioned at a position in 3D space based on depth data corresponding to the user 105's nose. In another example, the additional data is used to generate a 3D model or partial 3D model corresponding to the shape of user 105 and the 2D video stream data is used to determine a texture applied to such as shape. This may involve interpolation, e.g., determining a texture color for a portion of the 3D model based on a closest corresponding portion of the 2D video stream or by averaging values associated with two or more closest corresponding portions of the 2D video stream. In some implementations, the additional data comprises previously determined shape and texture data representing a 3D appearance of user 105, e.g., from a prior enrollment, and live data from live captured image or depth data of user 105. Such prior and live data may be merged to produce a 3D representation 320 of the user 100 via one or more algorithms or machine learning processes.

The virtual screen 330 and 3D representation 320 are not part of the physical environment 200 but rather parts of the XR environment that is generated based on the physical environment 200 and the received data. The user 205 sees a view of the XR environment that includes the virtual screen 330 and the 3D representation 320. The virtual screen 330 depicts background elements of the received 2D video stream while the 3D representation 320 depicts the 3D appearance of the user 110 that is depicted in the 2D video stream. The XR environment may be generated based on determining 3D positions for the virtual screen 330 and the 3D representation 320 relative to a 3D coordinate system of the physical environment 200. A view of the XR environment including the virtual screen 330 and 3D representation 320 may be presented by the electronic device 310. The electronic device 310 may present different views to each eye, e.g., the left eye view and right eye view may differ from one another to provide the appearance of depth. The 3D representation 320 is positioned in front of the virtual screen 330 in the 3D coordinate space and thus the user 205 may experience the received content with more of a 3D appearance than the user 205 experiences in viewing the same received video content via device 210 of FIG. 2.

A stitching technique may be used to fill in holes or other visual disparities that result from displaying a portion of a 2D video stream as a 3D representation in front of a 2D representation of remaining portions. The 2D video stream may be filtered such that the virtual screen 330 displays only some of the 2D video content, and thus excludes some of the content such as content depicting the user 105. Such portions may be determined based on a semantic segmentation of the 2D video content (by device 110 or 310) that identifies objects or object types in the 2D video content. Viewing the 3D representation 320 in front of the virtual screen 330 from a given (and changeable) viewpoint of the XR environment may introduce visual anomalies. For example, there may be holes or blank portions in the virtual screen 330 content which otherwise would have been occupied by a 2D depiction of the user 110. Such visual anomalies may be identified and corrected. For example, the electronic device 310 may perform image correction, hole filling, image hallucination/completion, stitching, add visual effects, or otherwise alter the provided view to correct such visual anomalies. In some implementations, this may involve extending a background region to include a void area on a virtual screen at which an object/user would have otherwise been depicted.

Figure 4:
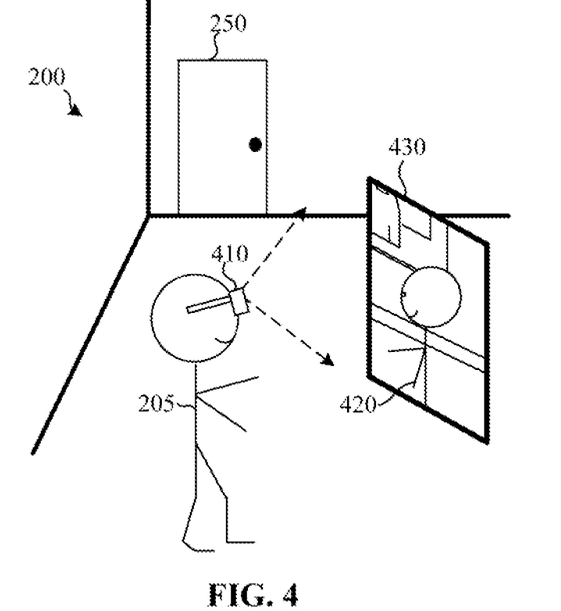

In FIG. 4, the electronic device 410 is a head mounted display (HMD) that has a display for each eye (e.g., a left eye display and a right eye display). The electronic device 410 is configured for stereo viewing. The electronic device 410 receives shared content from electronic device 110 during the communication session that includes a 2D video stream and additional data. The electronic device 410 determines a presentation mode based on recognizing or otherwise determining whether circumstances satisfy a criterion. For example, the criterion may include whether the received data (e.g., data shared by electronic device 110) provides sufficient 3D information to enable a 3D depiction having a threshold quality. Such quality may be based on the density of 3D data (e.g., points per volume/area, number of vertices/faces per area, etc.), the distance away of the object relative to the capturing viewpoint (e.g., whether the user 105 was 2 feet or 6 feet from the electronic device 110), or other factors.

In the example of FIG. 4, based on determining that the received data (e.g., data shared by electronic device 110) does not provide sufficient 3D information to enable a 3D depiction having a threshold quality, electronic device 410 determines to use a presentation mode in which the 2D video stream is presented in 2D as part of a 3D extended reality (XR) environment that is based on the physical environment 200. It determines that the 2D video stream will be viewed as a 2D object. FIG. 4 illustrates a virtual screen 430 that is positioned in the XR environment relative to the physical environment 200. In this example, the additional data is not used in providing the view.

The virtual screen 430 is not part of the physical environment 200 but rather part of the XR environment that is generated based on the physical environment 200 and the received data. The user 205 sees a view of the XR environment that includes the virtual screen 430 displaying the 2D video stream at a planar region of the XR environment. The XR environment may be generated by determining a 3D position for the virtual screen 430 relative to a 3D coordinate system of the physical environment 200. A view of the XR environment including the virtual screen 430 may be presented by the electronic device 410. The electronic device 410 may present different views to each eye, e.g., the left eye view and right eye view may differ from one another to provide an XR experience in which the user 205 perceives the received content as 2D content displayed on a flat virtual screen 430 positioned within the 3D environment of the XR environment.

Figure 5:
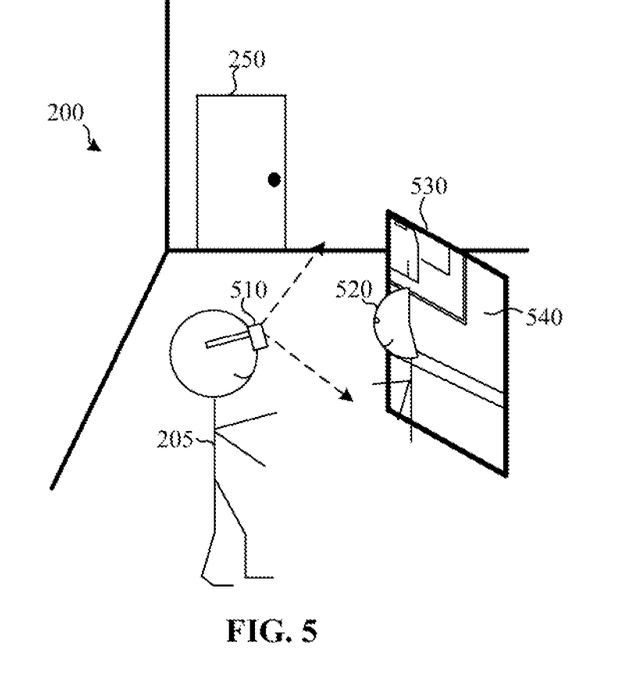

In FIG. 5, the electronic device 510 is a head mounted display (HMD) that has a display for each eye (e.g., a left eye display and a right eye display). The electronic device 510 is configured for stereo viewing. The electronic device 510 received shared content from electronic device 110 during the communication session that includes a 2D video stream and additional data. The electronic device 510 determines a presentation mode based on recognizing or otherwise determining whether circumstances satisfy a criterion. For example, the criterion includes whether the electronic device 510 is configured for stereo viewing or not configured for stereo viewing and whether there is sufficient 3D data to provide a full or partial 3D representation of an object. In the example of FIG. 5, based on determining that the electronic device 510 is configured for stereo viewing and that there is sufficient information for partial but not full 3D representation of the object, it determines to use a presentation mode in which the 2D video stream is presented as part of an extended reality (XR) environment that is based on the physical environment 200 in which a representation will be provided in 2.5D (e.g., as an incomplete or partial 3D representation). FIG. 5 illustrates a virtual screen 530 and a partial 3D representation 520 (e.g., representing front portion but not back portions of a head of the user 110) that are positioned in the XR environment relative to the physical environment 200.

A 2.5D representation may be created from the 2D video stream and the additional data using various techniques. Generally, techniques such as those used for generating a 3D representation may be used to generate a 2.5D representation. Such techniques may differ in that 2.5D techniques may generate the appearance of only a partial representation, e.g., a representation having gaps or portions that are incomplete when viewed from certain angles, e.g., when viewed from the back. In some implementations, a 2.5D representation is generated by positioning or otherwise using 2D video stream data to define the appearance of one or more incomplete 3D surfaces, e.g., positioning 2D video stream data of the user 105's face on a front surface of a 3D model that represents only the front of the user's head without representing the 3D shape or appearance of the back of the user's head.

The virtual screen 530 and partial 3D representation 520 are not part of the physical environment 200 but rather parts of the XR environment that is generated based on the physical environment 200 and the received data. The user 205 sees a view of the XR environment that includes the virtual screen 530 and the partial 3D representation 520. Thus, the virtual screen 530 depicts background elements of the received 2D video stream while the partial 3D representation 520 depicts a portion of the user 110 that is depicted in the 2D video stream. In some implementations, only portions of an object such as a user that have 3D data above a threshold quality are depicted in the partial representation. Portions for which there is no 3D data or sparse 3D data are not represented.

The XR environment may be generated by determining 3D positions for the virtual screen 530 and the partial 3D representation 520 relative to a 3D coordinate system of the physical environment 200. A view of the XR environment including the virtual screen 530 and partial 3D representation 520 may be presented by the electronic device 510. The electronic device 510 may present different views to each eye, e.g., the left eye view and right eye view may differ from one another to provide the appearance of depth. The partial user representation 520 is positioned in front of the virtual screen 530 in the 3D coordinate space and thus the user 205 may experience the received content with more of a 3D appearance than the user 205 experiences in viewing the content via device 210 of FIG. 2.

Figure 6:
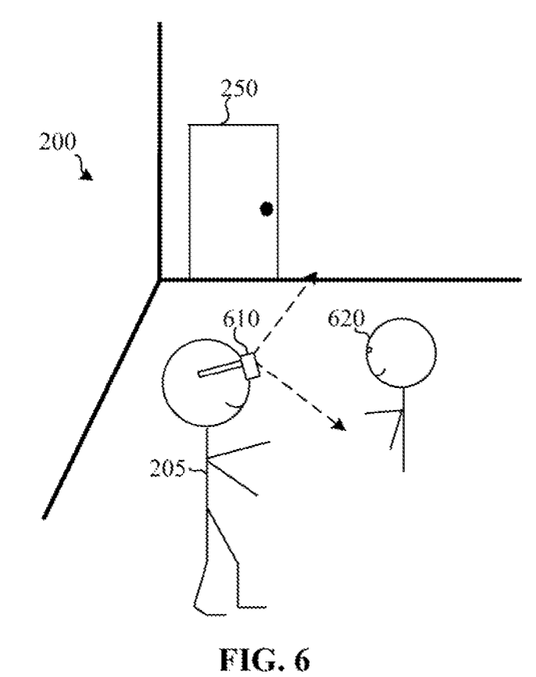

In FIG. 6, the electronic device 610 is a head mounted display (HMD) that has a display for each eye (e.g., a left eye display and a right eye display). The electronic device 610 is configured for stereo viewing. The electronic device 610 receives shared content from electronic device 110 during the communication session that includes a 2D video stream and additional data. The electronic device 610 determines a presentation mode based on recognizing or otherwise determining whether the circumstances satisfy a criterion. For example, the criterion may include a user selection of a presentation mode or an object depicted within a representation of received content. For example, user 205 may have provided input (e.g., via voice, gaze, hand gesture, etc.) selecting a representation of the user 110 for viewing in an isolation or enhanced presentation mode, e.g., making such a selection in a 2D view of the received 2D video stream. In the example of FIG. 6, based on determining that such a criterion is satisfied, the electronic device 610 provides a view that depicts a 3D representation 620 extracted from the 2D video stream, where the 3D representation is positioned in an XR environment relative to the physical environment 200. The 3D representation is presented with a 3D appearance based on the additional data.

The 3D representation 620 is not part of the physical environment 200 but rather part of the XR environment that is generated based on the physical environment 200 and the received data. The user 205 sees a view of the XR environment that includes the 3D representation 620. Thus, the 3D representation 620 depicts the user 110 that is depicted in the 2D video stream and other portions of the 2D video stream are not presented or are presented separately, e.g., in a separate or unrelated portion of the XR environment.

The XR environment may be generated by determining a 3D position for the 3D representation 620 relative to a 3D coordinate system of the physical environment 200. A view of the XR environment including the 3D representation 620 may be presented by the electronic device 610. The electronic device 610 may present different views to each eye, e.g., the left eye view and right eye view may differ from one another to provide the appearance of depth. The 3D representation 620 is presented with the appearance of depth and thus the user 205 may experience a depiction of the user 110 with more of a 3D appearance than the user 205 experiences in FIG. 2.

Figure 7:
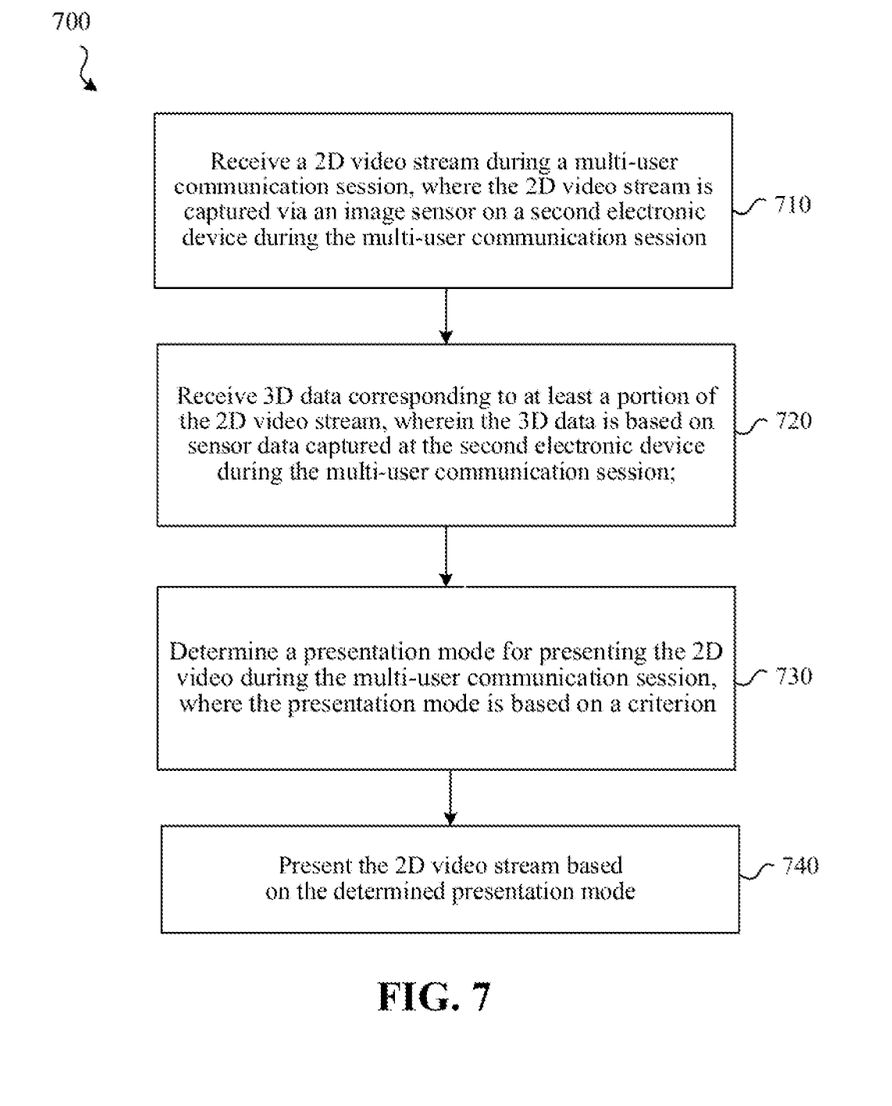
FIG. 7 is a flowchart illustrating a method for presenting content received during a communication session using a selected presentation mode, in accordance with some implementations.

FIG. 7 is a flowchart illustrating a method 700 for presenting content received during a communication session using a selected presentation mode. In some implementations, a device such as on of electronic devices 210, 310, 410, 510, 610 or another device, or a combination of two or more of such devices, performs method 700. In some implementations, method 700 is performed on a mobile device, desktop, laptop, HMD, ear-mounted device or server device. The method 700 is performed by processing logic, including hardware, firmware, software, or a combination thereof. In some implementations, the method 700 is performed on a processor executing code stored in a non-transitory computer-readable medium (e.g., a memory).

At block 710, the method 700 receives a 2D video stream during a multi-user communication session, where the 2D video stream is captured via an image sensor on a second electronic device during the multi-user communication session. The 2D video stream may depict an object. The 2D video stream may depict a user, e.g., providing a representation of a portion of a user of a second electronic device.

At block 720, the method 700 receives 3D data corresponding to at least a portion of the 2D video stream, where the 3D data is based on sensor data captured at the second electronic device during the multi-user communication session. The 3D data may correspond to particular objects depicted in the 2D video or particular time segments, such as every 10th frame. The 3D data may be based on sensor data captured by one or more sensors. For example, the 3D data is captured by a depth sensor separate from the image sensor of the second electronic device. In another example, the 3D data is captured by a stereo camera of the second electronic device. The 3D data may include data generated or received prior to the communication session. The 3D data may include data for each frame of the 2D video stream. The 3D data may correspond to a frame rate that is less than a frame rate of the 2D video stream, e.g., every 10th frame of the 2D video stream.

At block 730, the method 700 determines a presentation mode for presenting the 2D video during the multi-user communication session, where the presentation mode is based on a criterion. The presentation mode is determined to be a first presentation mode depicting the 2D video stream without using the 3D data or a second presentation mode depicting the 2D video stream using the 3D data to provide an appearance of depth to an object depicted in the 2D video stream. The criterion may include whether the electronic device has a predetermined type (e.g., tablet, mobile device, HMD, etc.). The criterion may include whether the electronic device has a stereo display. The criterion may include whether the 3D data represents more than a threshold percentage of a surface of the object. The criterion may include whether the 3D data provides a coverage of the object having a characteristic (e.g., no holes on at least a front surface, portions visible from a given viewpoint or a side of the object). The criterion may include whether the 3D data has more than a threshold quality (e.g., density of depth data, distance away of the object/user).

The criterion may include whether there is an object in the 2D video stream that is appropriate for display in 2.5D or 3D. For example, if it is determined that the other user's face is in the video, then that face may be represented in 2.5D or 3D. In some implementations, images of the 2D image stream are analyzed, e.g., via a semantic segmentation technique, to identify particular objects or object types currently present within the 2D video stream so that an appropriate presentation mode may be selected. 2.5D refers to a representation that has depth but that is not necessarily a complete 3D representation of the entire shape of an object.

At block 740, the method 700 presents the 2D video stream based on the determined presentation mode. In some implementations, the 2D video stream is presented based on the second presentation mode by determining 3D positions for portions of the object based on the 3D data in a 3D environment, determining a 3D position for another part of the 2D video on a background plane in the 3D environment, and rendering a view of the of the 3D environment based on a viewpoint position within the 3D environment.

The method 700 may determine to present the object in a third presentation mode, where the object is presented separate from another portion of the 2D video stream. In some implementations, the method 700 determines to present the object in the third presentation mode based on user input or a quality of the 3D data. It may present an indication that the third presentation mode is available based on a quality of the 3D data. FIG. 6 illustrates an example of such a third presentation mode.

Figure 8:
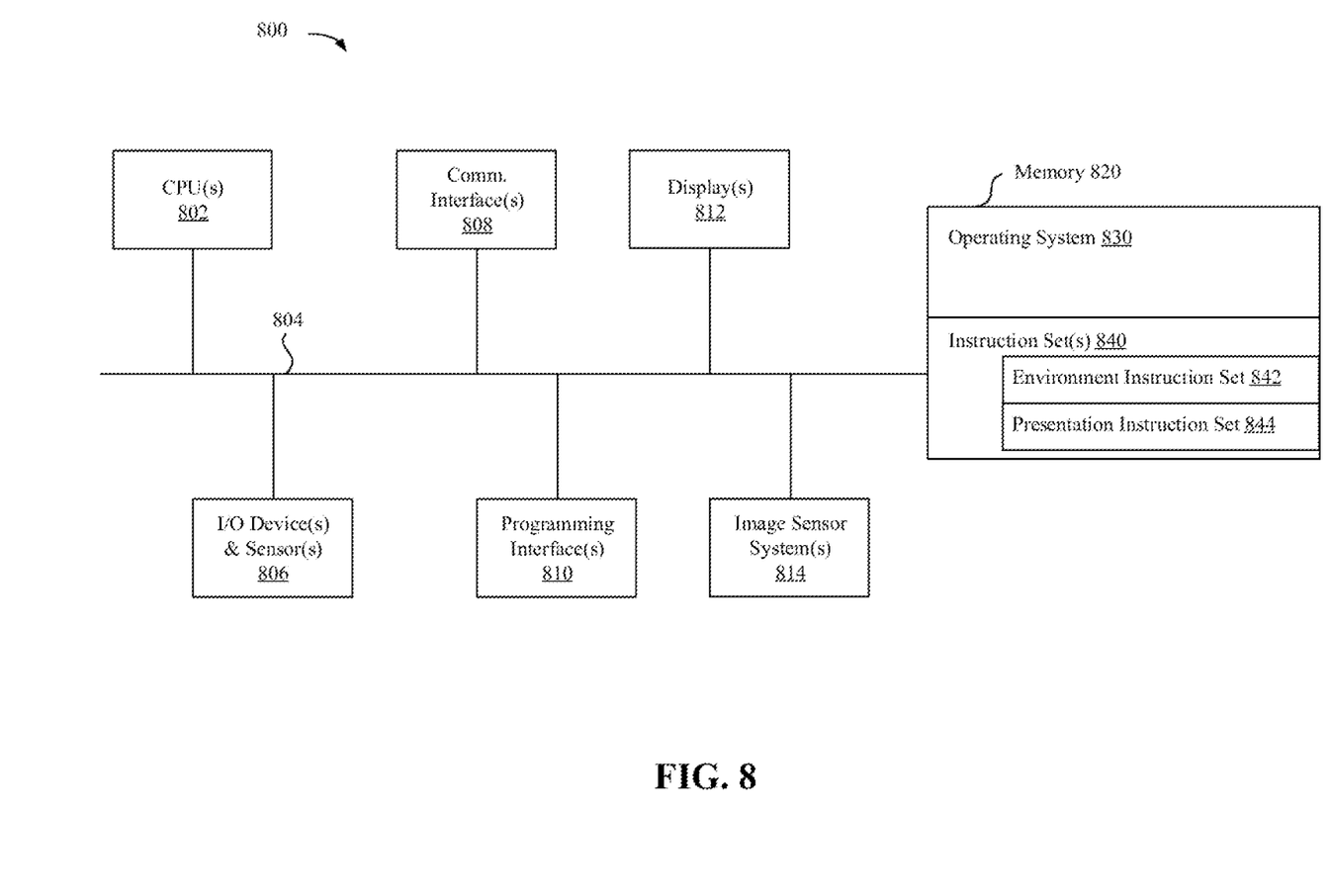
FIG. 8 is a block diagram of an electronic device of in accordance with some implementations.

FIG. 8 is a block diagram of electronic device 800. Device 800 illustrates an exemplary device configuration for electronic device 105 or electronic device 155. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 800 includes one or more processing units 802 (e.g., microprocessors, ASICs, FPGAs, GPUs, CPUs, processing cores, and/or the like), one or more input/output (I/O) devices and sensors 806, one or more communication interfaces 808 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, and/or the like type interface), one or more programming (e.g., I/O) interfaces 810, one or more output device(s) 812, one or more interior and/or exterior facing image sensor systems 814, a memory 820, and one or more communication buses 804 for interconnecting these and various other components.

In some implementations, the one or more communication buses 804 include circuitry that interconnects and controls communications between system components. In some implementations, the one or more I/O devices and sensors 806 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more output device(s) 812 include one or more displays configured to present a view of a 3D environment to the user. In some implementations, the one or more displays 812 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), and/or the like display types. In some implementations, the one or more displays correspond to diffractive, reflective, polarized, holographic, etc. waveguide displays. In one example, the device 800 includes a single display. In another example, the device 800 includes a display for each eye of the user.

In some implementations, the one or more output device(s) 812 include one or more audio producing devices. In some implementations, the one or more output device(s) 812 include one or more speakers, surround sound speakers, speaker-arrays, or headphones that are used to produce spatialized sound, e.g., 3D audio effects. Such devices may virtually place sound sources in a 3D environment, including behind, above, or below one or more listeners. Generating spatialized sound may involve transforming sound waves (e.g., using head-related transfer function (HRTF), reverberation, or cancellation techniques) to mimic natural soundwaves (including reflections from walls and floors), which emanate from one or more points in a 3D environment. Spatialized sound may trick the listener's brain into interpreting sounds as if the sounds occurred at the point(s) in the 3D environment (e.g., from one or more particular sound sources) even though the actual sounds may be produced by speakers in other locations. The one or more output device(s) 812 may additionally or alternatively be configured to generate haptics.

In some implementations, the one or more image sensor systems 814 are configured to obtain image data that corresponds to at least a portion of a physical environment. For example, the one or more image sensor systems 814 may include one or more RGB cameras (e.g., with a complimentary metal-oxide-semiconductor (CMOS) image sensor or a charge-coupled device (CCD) image sensor), monochrome cameras, IR cameras, depth cameras, event-based cameras, and/or the like. In various implementations, the one or more image sensor systems 814 further include illumination sources that emit light, such as a flash. In various implementations, the one or more image sensor systems 814 further include an on-camera image signal processor (ISP) configured to execute a plurality of processing operations on the image data.

The memory 820 includes high-speed random-access memory, such as DRAM, SRAM, DDR RAM, or other random-access solid-state memory devices. In some implementations, the memory 820 includes non-volatile memory, such as one or more magnetic disk storage devices, optical disk storage devices, flash memory devices, or other non-volatile solid-state storage devices. The memory 820 optionally includes one or more storage devices remotely located from the one or more processing units 802. The memory 820 comprises a non-transitory computer readable storage medium.

In some implementations, the memory 820 or the non-transitory computer readable storage medium of the memory 820 stores an optional operating system 830 and one or more instruction set(s) 840. The operating system 830 includes procedures for handling various basic system services and for performing hardware dependent tasks. In some implementations, the instruction set(s) 840 include executable software defined by binary information stored in the form of electrical charge. In some implementations, the instruction set(s) 840 are software that is executable by the one or more processing units 802 to carry out one or more of the techniques described herein.

The instruction set(s) 840 include an environment instruction set 842 configured to, upon execution, provides views during a communication session of an environment such as an XR environment as described herein. The instruction set(s) 840 further include a presentation instruction set 844 configured to, upon execution, present 2D video stream content as described herein. The instruction set(s) 840 may be embodied as a single software executable or multiple software executables.

Although the instruction set(s) 840 are shown as residing on a single device, it should be understood that in other implementations, any combination of the elements may be located in separate computing devices. Moreover, FIG. 8 is intended more as functional description of the various features which are present in a particular implementation as opposed to a structural schematic of the implementations described herein. As recognized by those of ordinary skill in the art, items shown separately could be combined and some items could be separated. The actual number of instructions sets and how features are allocated among them may vary from one implementation to another and may depend in part on the particular combination of hardware, software, and/or firmware chosen for a particular implementation.

It will be appreciated that the implementations described above are cited by way of example, and that the present invention is not limited to what has been particularly shown and described hereinabove. Rather, the scope includes both combinations and sub combinations of the various features described hereinabove, as well as variations and modifications thereof which would occur to persons skilled in the art upon reading the foregoing description and which are not disclosed in the prior art.

As described above, one aspect of the present technology is the gathering and use of sensor data that may include user data to improve a user's experience of an electronic device. The present disclosure contemplates that in some instances, this gathered data may include personal information data that uniquely identifies a specific person or can be used to identify interests, traits, or tendencies of a specific person. Such personal information data can include movement data, physiological data, demographic data, location-based data, telephone numbers, email addresses, home addresses, device characteristics of personal devices, or any other personal information.

The present disclosure recognizes that the use of such personal information data, in the present technology, can be used to the benefit of users. For example, the personal information data can be used to improve the content viewing experience. Accordingly, use of such personal information data may enable calculated control of the electronic device. Further, other uses for personal information data that benefit the user are also contemplated by the present disclosure.

The present disclosure further contemplates that the entities responsible for the collection, analysis, disclosure, transfer, storage, or other use of such personal information and/or physiological data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates implementations in which users selectively block the use of, or access to, personal information data. That is, the present disclosure contemplates that hardware or software elements can be provided to prevent or block access to such personal information data. For example, in the case of user-tailored content delivery services, the present technology can be configured to allow users to select to "opt in" or "opt out" of participation in the collection of personal information data during registration for services. In another example, users can select not to provide personal information data for targeted content delivery services. In yet another example, users can select to not provide personal information, but permit the transfer of anonymous information for the purpose of improving the functioning of the device.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences or settings based on non-personal information data or a bare minimum amount of personal information, such as the content being requested by the device associated with a user, other non-personal information available to the content delivery services, or publicly available information.

In some embodiments, data is stored using a public/private key system that only allows the owner of the data to decrypt the stored data. In some other implementations, the data may be stored anonymously (e.g., without identifying and/or personal information about the user, such as a legal name, username, time and location data, or the like). In this way, other users, hackers, or third parties cannot determine the identity of the user associated with the stored data. In some implementations, a user may access their stored data from a user device that is different than the one used to upload the stored data. In these instances, the user may be required to provide login credentials to access their stored data.

Numerous specific details are set forth herein to provide a thorough understanding of the claimed subject matter. However, those skilled in the art will understand that the claimed subject matter may be practiced without these specific details. In other instances, methods apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general-purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method comprising:
   at a processor of an electronic device:
   receiving a two-dimensional (2D) video stream during a multi-user communication session, wherein the 2D video stream is captured via an image sensor on a second electronic device during the multi-user communication session;

receiving three-dimensional (3D) data corresponding to at least a portion of the 2D video stream, wherein the 3D data is based on sensor data captured at the second electronic device during the multi-user communication session;

determining, based on a criterion, a presentation mode for presenting the 2D video during the multi-user communication session;

in accordance with a determination that the presentation mode is a first presentation mode, presenting a representation of the 2D video stream without using the 3D data; and in accordance with a determination that the presentation mode is a second presentation mode, presenting a representation of the 2D video stream using the 3D data to provide an appearance of depth to an object depicted in the 2D video stream, wherein presenting the representation of the 2D video stream using the 3D data comprises:

determining a 3D position for the object based on the 3D data in a 3D environment;

determining a 3D position for another part of the 2D video, different than the object, in the 3D environment; and rendering a view of the 3D environment based on a viewpoint position within the 3D environment.

2. The method of claim 1, wherein the presentation mode is determined to be the second presentation mode, and wherein presenting a representation of the 2D video stream using the 3D data comprises:

determining 3D positions for portions of the object based on the 3D data in a 3D environment;

determining a 3D position for another part of the 2D video on a background plane in the 3D environment; and rendering a view of the of the 3D environment based on a viewpoint position within the 3D environment.

3. The method of claim 1, wherein:

the criterion comprises whether the electronic device has a predetermined type, and wherein the presentation mode is determined to be the second presentation mode in accordance with a determination that the electronic device has the predetermined type;

the criterion comprises whether the electronic device has a stereo display, and wherein the presentation mode is determined to be the second presentation mode in accordance with a determination that electronic device has a stereo display;

the criterion comprises whether the 3D data represents more than a threshold percentage of a surface of the object, and wherein the presentation mode is determined to be the second presentation mode in accordance with a determination that the 3D data represents more than the threshold percentage of the surface of the object;

the criterion comprises whether the 3D data provides a coverage of the object having a characteristic, and wherein the presentation mode is determined to be the second presentation mode in accordance with a determination that the 3D data provides a coverage of the object having the characteristic;

the criterion comprises whether the 3D data has more than a threshold quality, and wherein the presentation mode is determined to be the second presentation mode in accordance with a determination that the 3D data has more than the threshold quality;

the criterion comprises whether the object is of a predetermined type, and wherein the presentation mode is determined to be the second presentation mode in accordance with a determination that the object is of the predetermined type; or the criterion comprises whether the object is of a face, and wherein the presentation mode is determined to be the second presentation mode in accordance with a determination that the object is a face.

4. The method of claim 1, wherein the object is a representation of a portion of a user of the second electronic device.

5. The method of claim 1, wherein the 3D data corresponds to a frame rate that is less than a frame rate of the 2D video content.

6. The method of claim 1, wherein in accordance with a determination that the presentation mode is a third presentation mode, presenting a representation of the 2D video stream in which the object is presented separate from another portion of the 2D video stream.

7. The method of claim 6, wherein the criterion comprises whether a user input is received or the 3D data has more than a threshold quality, and wherein the presentation mode is determined to be the third presentation mode in accordance with a determination that the user input is received or the 3D data has more than the threshold quality.

8. The method of claim 6 further comprising presenting an indication that the third presentation mode is available based on a quality of the 3D data.

9. An electronic device comprising:

a non-transitory computer-readable storage medium; and one or more processors coupled to the non-transitory computer-readable storage medium, wherein the non-transitory computer-readable storage medium comprises program instructions that, when executed on the one or more processors, cause the electronic device to perform operations comprising:

receiving a two-dimensional (2D) video stream during a multi-user communication session, wherein the 2D video stream is captured via an image sensor on a second electronic device during the multi-user communication session;

receiving three-dimensional (3D) data corresponding to at least a portion of the 2D video stream, wherein the 3D data is based on sensor data captured at the second electronic device during the multi-user communication session;

determining, based on a criterion, a presentation mode for presenting the 2D video during the multi-user communication session;

in accordance with a determination that the presentation mode is a first presentation mode, presenting a representation of the 2D video stream without using the 3D data; and in accordance with a determination that the presentation mode is a second presentation mode, presenting a representation of the 2D video stream using the 3D data to provide an appearance of depth to an object depicted in the 2D video stream, wherein presenting the representation of the 2D video stream using the 3D data comprises:

determining a 3D position for the object based on the 3D data in a 3D environment;

determining a 3D position for another part of the 2D video, different than the object, in the 3D environment; and rendering a view of the 3D environment based on a viewpoint position within the 3D environment.

10. The electronic device of claim 9, wherein the presentation mode is determined to be the second presentation mode, and wherein presenting a representation of the 2D video stream using the 3D data comprises:

determining 3D positions for portions of the object based on the 3D data in a 3D environment;

determining a 3D position for another part of the 2D video on a background plane in the 3D environment; and rendering a view of the of the 3D environment based on a viewpoint position within the 3D environment.

11. The electronic device of claim 9, wherein:

the criterion comprises whether the electronic device has a predetermined type, and wherein the presentation mode is determined to be the second presentation mode in accordance with a determination that the electronic device has the predetermined type;

the criterion comprises whether the electronic device has a stereo display, and wherein the presentation mode is determined to be the second presentation mode in accordance with a determination that electronic device has a stereo display;

the criterion comprises whether the 3D data represents more than a threshold percentage of a surface of the object, and wherein the presentation mode is determined to be the second presentation mode in accordance with a determination that the 3D data represents more than the threshold percentage of the surface of the object;

the criterion comprises whether the 3D data provides a coverage of the object having a characteristic, and wherein the presentation mode is determined to be the second presentation mode in accordance with a determination that the 3D data provides a coverage of the object having the characteristic;

the criterion comprises whether the 3D data has more than a threshold quality, and wherein the presentation mode is determined to be the second presentation mode in accordance with a determination that the 3D data has more than the threshold quality;

the criterion comprises whether the object is of a predetermined type, and wherein the presentation mode is determined to be the second presentation mode in accordance with a determination that the object is of the predetermined type; or the criterion comprises whether the object is of a face, and wherein the presentation mode is determined to be the second presentation mode in accordance with a determination that the object is a face.

12. The electronic device of claim 9, wherein the object is a representation of a portion of a user of the second electronic device.

13. The electronic device of claim 9, wherein the 3D data corresponds to a frame rate that is less than a frame rate of the 2D video content.

14. The electronic device of claim 9, wherein in accordance with a determination that the presentation mode is a third presentation mode, presenting a representation of the 2D video stream in which the object is presented separate from another portion of the 2D video stream.

15. The electronic device of claim 14, wherein the criterion comprises whether a user input is received or the 3D data has more than a threshold quality, and wherein the presentation mode is determined to be the third presentation mode in accordance with a determination that the user input is received or the 3D data has more than the threshold quality.

16. The electronic device of claim 14, wherein the operations further comprise presenting an indication that the third presentation mode is available based on a quality of the 3D data.

17. A non-transitory computer-readable storage medium storing program instructions executable via one or more processors to perform operations comprising:

receiving a two-dimensional (2D) video stream during a multi-user communication session, wherein the 2D video stream is captured via an image sensor on a second electronic device during the multi-user communication session;

receiving three-dimensional (3D) data corresponding to at least a portion of the 2D video stream, wherein the 3D data is based on sensor data captured at the second electronic device during the multi-user communication session;

determining, based on a criterion, a presentation mode for presenting the 2D video during the multi-user communication session;

in accordance with a determination that the presentation mode is a first presentation mode, presenting a representation of the 2D video stream without using the 3D data; and in accordance with a determination that the presentation mode is a second presentation mode, presenting a representation of the 2D video stream using the 3D data to provide an appearance of depth to an object depicted in the 2D video stream, wherein presenting the representation of the 2D video stream using the 3D data comprises:

determining a 3D position for the object based on the 3D data in a 3D environment;

determining a 3D position for another part of the 2D video, different than the object, in the 3D environment; and rendering a view of the 3D environment based on a viewpoint position within the 3D environment.

18. The non-transitory computer-readable storage medium of claim 17, wherein the presentation mode is determined to be the second presentation mode, and wherein presenting a representation of the 2D video stream using the 3D data comprises:

determining 3D positions for portions of the object based on the 3D data in a 3D environment;

determining a 3D position for another part of the 2D video on a background plane in the 3D environment; and rendering a view of the of the 3D environment based on a viewpoint position within the 3D environment.

19. The non-transitory computer-readable storage medium of claim 17, wherein:

the criterion comprises whether the electronic device has a predetermined type, and wherein the presentation mode is determined to be the second presentation mode in accordance with a determination that the electronic device has the predetermined type;

the criterion comprises whether the electronic device has a stereo display, and wherein the presentation mode is determined to be the second presentation mode in accordance with a determination that electronic device has a stereo display;

the criterion comprises whether the 3D data represents more than a threshold percentage of a surface of the object, and wherein the presentation mode is determined to be the second presentation mode in accordance with a determination that the 3D data represents more than the threshold percentage of the surface of the object;

the criterion comprises whether the 3D data provides a coverage of the object having a characteristic, and wherein the presentation mode is determined to be the second presentation mode in accordance with a determination that the 3D data provides a coverage of the object having the characteristic;

the criterion comprises whether the 3D data has more than a threshold quality, and wherein the presentation mode is determined to be the second presentation mode in accordance with a determination that the 3D data has more than the threshold quality;

the criterion comprises whether the object is of a predetermined type, and wherein the presentation mode is determined to be the second presentation mode in accordance with a determination that the object is of the predetermined type; or the criterion comprises whether the object is of a face, and wherein the presentation mode is determined to be the second presentation mode in accordance with a determination that the object is a face.

20. The non-transitory computer-readable storage medium of claim 17, wherein the object is a representation of a portion of a user of the second electronic device.

21. The non-transitory computer-readable storage medium of claim 17, wherein the 3D data corresponds to a frame rate that is less than a frame rate of the 2D video content.

22. The non-transitory computer-readable storage medium of claim 17, wherein in accordance with a determination that the presentation mode is a third presentation mode, presenting a representation of the 2D video stream in which the object is presented separate from another portion of the 2D video stream.

23. The non-transitory computer-readable storage medium of claim 22, wherein the criterion comprises whether a user input is received or the 3D data has more than a threshold quality, and wherein the presentation mode is determined to be the third presentation mode in accordance with a determination that the user input is received or the 3D data has more than the threshold quality.

24. The non-transitory computer-readable storage medium of claim 22, wherein the operations further comprise presenting an indication that the third presentation mode is available based on a quality of the 3D data.

* * * * *